United States Patent
Shimizu et al.

(10) Patent No.: US 11,749,463 B2
(45) Date of Patent: Sep. 5, 2023

(54) CAPACITOR AND METHOD FOR MANUFACTURING THE SAME

(71) Applicant: Murata Manufacturing Co., Ltd., Nagaokakyo (JP)

(72) Inventors: Yasuhiro Shimizu, Nagaokakyo (JP); Masaki Nagata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 63 days.

(21) Appl. No.: 17/653,392

(22) Filed: Mar. 3, 2022

(65) Prior Publication Data

US 2022/0189702 A1 Jun. 16, 2022

Related U.S. Application Data

(63) Continuation of application No. PCT/JP2020/016272, filed on Apr. 13, 2020.

(30) Foreign Application Priority Data

Sep. 25, 2019 (JP) .................................. 2019-174347

(51) Int. Cl.
*H01G 4/30* (2006.01)
*H01G 4/08* (2006.01)

(52) U.S. Cl.
CPC ................. *H01G 4/30* (2013.01); *H01G 4/08* (2013.01)

(58) Field of Classification Search
None
See application file for complete search history.

(56) References Cited

U.S. PATENT DOCUMENTS

| 8,004,821 B2 | 8/2011 | Oh |
| 9,406,442 B2 | 8/2016 | Manohara et al. |
| 2008/0285210 A1 | 11/2008 | Oh |

(Continued)

FOREIGN PATENT DOCUMENTS

| EP | 1538640 B1 * | 11/2016 | ............... H01G 4/30 |
| JP | 2003234254 A | 8/2003 | |

(Continued)

OTHER PUBLICATIONS

International Search Report issued in PCT/JP2020/016272, dated Jul. 21, 2020.

(Continued)

*Primary Examiner* — Dion R. Ferguson
(74) *Attorney, Agent, or Firm* — ArentFox Schiff LLP

(57) ABSTRACT

A capacitor is provided having a plurality of first conductive columnar portions that each have a nanosized outer diameter. Moreover, each of a plurality of second conductive columnar portions also have a nanosized outer diameter. A conductive portion is disposed on a first dielectric layer and faces at least a part of each of the plurality of first conductive columnar portions with the first dielectric layer interposed therebetween. The conductive portion is also disposed on a second dielectric layer and faces at least a part of each of the plurality of second conductive columnar portions with the second dielectric layer interposed therebetween. A tip of each of the second conductive columnar portions is located closer to a first support portion than a tip of each of the first conductive columnar portions.

20 Claims, 9 Drawing Sheets

(56) References Cited

U.S. PATENT DOCUMENTS

| | | | |
|---|---|---|---|
| 2009/0154054 A1* | 6/2009 | Masuda | H01G 4/005 |
| | | | 361/275.1 |
| 2013/0250479 A1 | 9/2013 | Manohara et al. | |
| 2013/0329337 A1* | 12/2013 | Masuda | H01G 4/232 |
| | | | 361/303 |
| 2014/0238731 A1* | 8/2014 | Kelley | B29C 48/00 |
| | | | 174/262 |
| 2015/0131205 A1 | 5/2015 | Amaratunga et al. | |
| 2017/0169949 A1* | 6/2017 | Manohara | B82Y 10/00 |
| 2022/0189702 A1* | 6/2022 | Shimizu | H01G 4/08 |
| 2022/0238275 A1* | 7/2022 | Nagata | H01G 4/33 |
| 2022/0238281 A1* | 7/2022 | Nagata | H01G 4/012 |
| 2022/0384564 A1* | 12/2022 | Chen | H01L 28/90 |

FOREIGN PATENT DOCUMENTS

| | | | |
|---|---|---|---|
| JP | 2005129566 A | | 5/2005 |
| JP | 2008193096 A | | 8/2008 |
| JP | 5091242 B2 | | 5/2012 |
| JP | 2015514315 A | | 5/2015 |
| JP | 2015519742 A | | 7/2015 |
| WO | WO-2021059570 A1 * | | 4/2021 |

OTHER PUBLICATIONS

Written Opinion of the International Searching Authority issued in PCT/JP2020/016272, dated Jul. 21, 2020.

* cited by examiner

CAPACITOR AND METHOD FOR MANUFACTURING THE SAME

CROSS REFERENCE TO RELATED APPLICATIONS

The present application is a continuation of PCT/JP2020/016272 filed Apr. 13, 2020, which claims priority to Japanese Patent Application No. 2019-174347, filed Sep. 25, 2019, the entire contents of each of which are incorporated herein by reference.

TECHNICAL FIELD

The present invention relates to a capacitor and a method for manufacturing the same.

BACKGROUND

Japanese Patent Application Laid-Open No. 2005-129566 (hereinafter "Patent Document 1") and Japanese Patent No. 5091242 (hereinafter "Patent Document 2") disclose existing capacitor configurations. The capacitor described in Patent Document 1 includes a positive electrode, a negative electrode, carbon nanotubes provided at each electrode of the positive electrode and the negative electrode, and a polyvinylidene fluoride (PVDF) dielectric filled between the carbon nanotubes between the positive electrode and the negative electrode. The positive electrode and the negative electrode face each other. Moreover, the carbon nanotubes provided on one of the positive electrode and the negative electrode are inserted between the carbon nanotubes provided on the other.

The capacitor described in Patent Document 2 is a 3D MIM capacitor and includes a lower plate and an upper plate. The lower plate is formed of a layer of conductive material. The top plate is also formed of a layer of conductive material. Each of the upper plate and the lower plate is separated by an insulating layer made of a high dielectric constant material. The surface on which a large number of nanofibers have grown is coated with these layers.

To improve the withstand voltage of a capacitor including a conductive columnar portion having a nanosized outer diameter, such as carbon nanotubes or nanofibers, for example, the capacitor described in Patent Document 1, a composite capacitor can be formed by stacking two capacitors that are identical to each other. However, the composite capacitor is doubled in volume and halved in capacitance with respect to one capacitor before stacking. That is, the composite capacitor as described above has a volume capacity density of ¼ of that of one capacitor before stacking.

To improve the withstand voltage of the capacitor described in Patent Document 2, it is conceivable to increase the thickness of the dielectric layer while making it uniform, for example. However, it is not easy to stack the dielectric layer uniformly and thickly on a conductive columnar portion having a nanosized outer diameter. In addition, it takes time to stack the dielectric layer as described above.

SUMMARY OF THE INVENTION

Accordingly, it is an object of the present invention to provide a capacitor including a plurality of conductive columnar portions having a nanosized outer diameter with improved withstand voltage while suppressing a decrease in volume capacity density. Moreover, the capacitor disclosed herein can be manufactured efficiently and easily.

According to an exemplary aspect, a capacitor is provided that includes a first support portion, a second support portion, a plurality of first conductive columnar portions, a first dielectric layer, a plurality of second conductive columnar portions, a second dielectric layer, and a conductive portion. The second support portion is located at a distance from the first support portion. Moreover, each of the plurality of first conductive columnar portions has a nanosized outer diameter. Each of the plurality of first conductive columnar portions is supported by the first support portion and extends in one direction from the first support portion toward the second support portion. Each of the plurality of first conductive columnar portions is coated with the first dielectric layer. Similarly, each of the plurality of second conductive columnar portions has a nanosized outer diameter. Each of the plurality of second conductive columnar portions is supported by the second support portion and extends in one direction from the second support portion toward the first support portion. Each of the plurality of second conductive columnar portions is coated with the second dielectric layer. The conductive portion is provided on the first dielectric layer and faces at least a part of each of the plurality of first conductive columnar portions with the first dielectric layer interposed therebetween. The conductive portion is provided on the second dielectric layer and faces at least a part of each of the plurality of second conductive columnar portions with the second dielectric layer interposed therebetween. In addition, a tip of each of the plurality of second conductive columnar portions is located closer to the first support portion than a tip of each of the plurality of first conductive columnar portions.

According to another exemplary aspect, a method for manufacturing a capacitor is provided in which the capacitor includes a first support portion, a second support portion, a plurality of first conductive columnar portions, a first dielectric layer, a plurality of second conductive columnar portions, a second dielectric layer, and a conductive portion, each of the plurality of first conductive columnar portions having a nanosized outer diameter, being supported by the first support portion, and extending in one direction separating from the first support portion, the first dielectric layer coating each of the plurality of first conductive columnar portions, each of the plurality of second conductive columnar portions having a nanosized outer diameter, being supported by the second support portion, and extending in one direction separating from the second support portion, the second dielectric layer coating each of the plurality of second conductive columnar portions, the conductive portion being provided on the first dielectric layer and facing at least a part of each of the plurality of first conductive columnar portions with the first dielectric layer interposed therebetween and being provided on the second dielectric layer and facing at least a part of each of the plurality of second conductive columnar portions with the second dielectric layer interposed therebetween. In this aspect, the method includes an approach step of bringing the second support portion close to the first support portion and a fixing step of fixing the plurality of first conductive columnar portions and the plurality of second conductive columnar portions to each other. In the approach step, by bringing the second support portion close to the first support portion, the tip of each of the plurality of second conductive columnar portions is arranged closer to the first support portion than the tip of each of the plurality of first conductive columnar portions. In the fixing step, the plurality of first conductive columnar portions and the plurality of second conductive columnar portions are fixed to each other with an adhesive and at least the first dielectric layer and the second dielectric layer interposed therebetween.

According to the exemplary aspect, the capacitor including a plurality of conductive columnar portions having a nanosized outer diameter provides for an improved withstand voltage while suppressing a decrease in volume capacity density. Moreover, the capacitor disclosed herein can be manufactured efficiently and easily.

DETAILED DESCRIPTION

Figure 1:
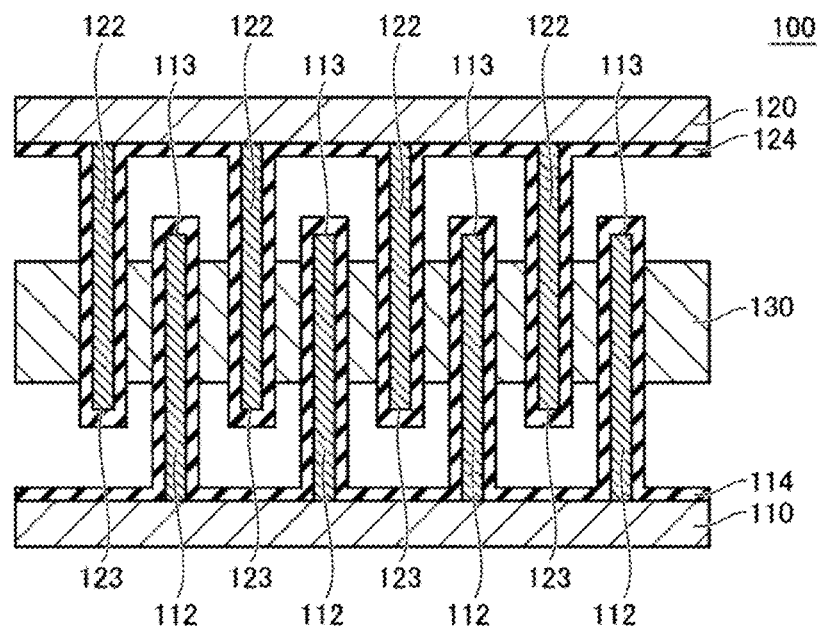
FIG. 1 is a sectional view showing a configuration of a capacitor according to a first exemplary embodiment.

Hereinafter, the capacitor according to each exemplary embodiment of the present invention will be described with reference to the drawings. In the following description of the embodiments, the same or corresponding parts in the drawings are designated by the same reference numerals, and the description thereof will not be repeated.

Embodiment 1

Figure 2:
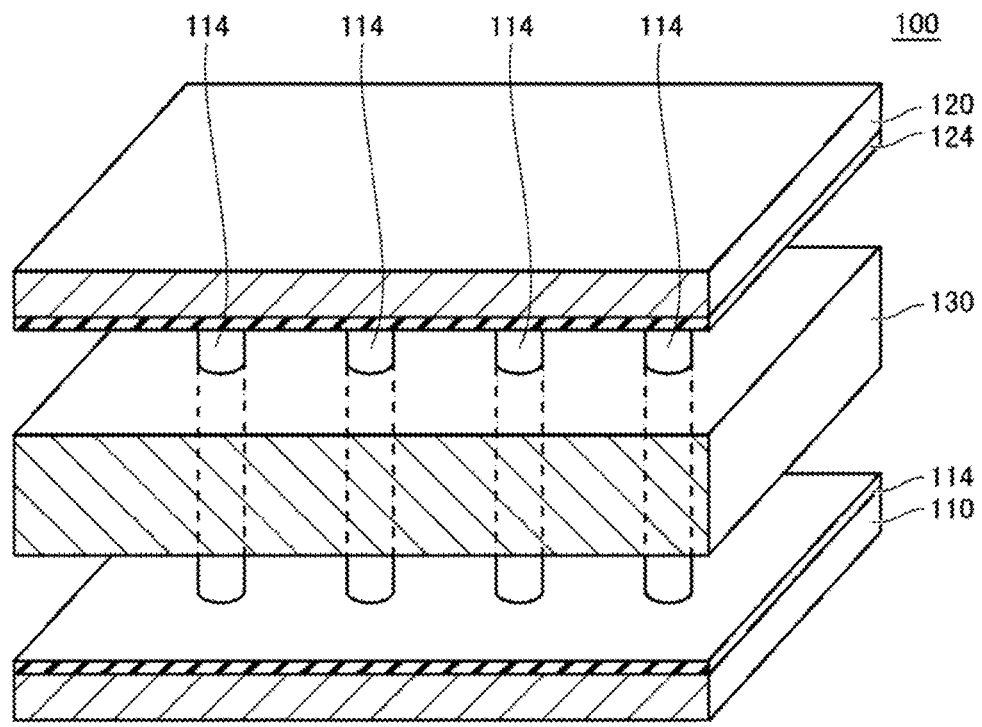
FIG. 2 is a perspective view schematically showing the configuration of the capacitor according to the first embodiment.

FIG. 1 is a sectional view showing a configuration of a capacitor according to a first exemplary embodiment. FIG. 2 is a perspective view schematically showing the configuration of the capacitor according to the first exemplary embodiment.

As shown in FIGS. 1 and 2, a capacitor 100 includes a first support portion 110, a second support portion 120, a plurality of first conductive columnar portions 112, a first dielectric layer 114, a plurality of second conductive columnar portions 122, a second dielectric layer 124, and a conductive portion 130.

The outer shape of the first support portion 110 is not particularly limited. In exemplary aspects, the first support portion 110 can have, for example, a plate-like, flat plate-like, thin film-like or film-like outer shape. For example, when the first support portion 110 has a flat plate shape, the first support portion 110 can be easily handled in manufacturing the capacitor 100. Moreover, when the first support portion 110 has a thin film shape, the thickness of the whole capacitor 100 can be reduced.

In the present embodiment, the face of the first support portion 110 on the second support portion 120 side is a substantially flat face. The outer shape of the first support portion 110 when viewed from the second support portion 120 side is not particularly limited. For example, the outer shape of the first support portion 110 can have a rounded corner such as an ellipse when the first support portion 110 is viewed from the second support portion 120 side in consideration of the case where the capacitor 100 is mounted, or may have a hole.

Moreover, the material of the first support portion 110 is not particularly limited. The first support portion 110 may be formed from a metal, a semiconductor material, ceramics, or a resin material formed by curing a polymer material. In an exemplary aspect, the first support portion 110 can be formed from a metal such as aluminum or copper. When the first support portion 110 is formed from a metal, the first support portion 110 can be used as a connection electrode for electrically connecting the first support portion 110 from the outside of the capacitor 100 to the first conductive columnar portion 112 described later, and furthermore, the heat resistance of the capacitor 100 is improved.

When the first support portion 110 is formed from a material other than metal, the first support portion 110 can be provided with a connection electrode or an electrical wiring portion for electrically connecting another electronic component different from the capacitor 100 and the first conductive columnar portion 112 to each other.

According to the exemplary aspect, each of the plurality of first conductive columnar portions 112 has a nanosized outer diameter. In the present specification, nanosize means 0.1 nm or more and 1000 nm or less. Moreover, each conductive columnar portion 112 may have a tubular shape or a bottomed tubular shape.

In the present embodiment, the plurality of first conductive columnar portions 112 are formed from a conductive material. The plurality of first conductive columnar portions 112 can be formed from a columnar material in which a semiconductor material or an insulating material is thinly coated with metal. Each of the plurality of first conductive columnar portions 112 includes, for example, carbon nanofibers or other nanofibers formed from ZnO or the like, nanorods or nanowires composed of ZnO, GaN, hematite or the like. In the present embodiment, the plurality of first conductive columnar portions 112 are specifically made of carbon nanotubes, and more specifically, each of the plurality of first conductive columnar portions 112 is made of a plurality of, for example 100 to 200 of, carbon nanotubes.

In the present embodiment, the chirality of the carbon nanotubes is not particularly limited. The carbon nanotubes may be a semiconductor type or a metal type, and the carbon nanotubes may include both a semiconductor type and a metal type in various exemplary aspects. From the viewpoint of electrical resistance, the carbon nanotubes have a higher ratio of metal type than semiconductor type in the exemplary aspect.

In the present embodiment, the number of layers forming each carbon nanotube is not particularly limited. Moreover, the carbon nanotube can be SWCNT (Single Wall Carbon Nanotube) composed of one layer or MWCNT (Multiwall Carbon Nanotube) formed from two or more layers.

Each of the plurality of first conductive columnar portions 112 is supported by the first support portion 110 and extends in one direction separating from the first support portion 110. In the present embodiment, each of the plurality of first conductive columnar portions 112 is provided in such a manner as to extend from the surface of the first support portion 110. However, in an alternative aspect, they can be provided in such a manner as to extend from the inside of the first support portion 110 to the outside.

The length of each of the plurality of first conductive columnar portions 112 is not particularly limited. In an exemplary aspect, the length of each of the plurality of first conductive columnar portions 112 can be long from the viewpoint of the capacity density per area in the plane direction orthogonal to the extending direction of the plurality of first conductive columnar portions 112. For example, the length of each of the plurality of first conductive columnar portions 112 can be several μm or more, 20 μm or more, 50 μm or more, 100 μm or more, 500 μm or more, 750 μm or more, 1000 μm or more, or 2000 μm or more.

Further, the lengths of the plurality of first conductive columnar portions 112 may be different from each other, but the tips of the plurality of first conductive columnar portions 112 are aligned on a virtual plane substantially perpendicular to the one direction in the exemplary aspect. This configuration allows the capacitance of the capacitor 100 according to the present embodiment to be easily controlled. Further, in the method for manufacturing the capacitor 100 according to the present embodiment described later, in the approach step of bringing the second support portion 120 close to the first support portion 110, the plurality of first conductive columnar portions 112 and the plurality of second conductive columnar portions 122 can be fitted deeper into each other due to this configuration.

As further shown, each of the plurality of first conductive columnar portions 112 is coated with the first dielectric layer 114. In the present embodiment, the first dielectric layer 114 coating each of the plurality of first conductive columnar portions 112 is located in such a manner as to be continuous with each other on the first support portion 110. More specifically, the whole of each of the plurality of first conductive columnar portions 112 is coated with the first dielectric layer 114 on the first support portion 110.

An additional conductor layer can be provided between the first dielectric layer 114 and the plurality of first conductive columnar portions 112. This configuration allows the parasitic resistance of the capacitor 100 to further decrease.

It is also noted that the material of the first dielectric layer 114 is not particularly limited, and for example, silicon dioxide, aluminum oxide, silicon nitride, tantalum oxide, hafnium oxide, barium titanate, lead zirconate titanate, or a combination thereof can be exemplified.

The second support portion 120 is located at a distance from (i.e., spaced apart from) the first support portion 110. The second support portion 120 can have a same or similar shape of the first support portion 110 as described above. Moreover, the second support portion 120 can be formed from a same material as the first support portion 110. In the present embodiment, the second support portion 120 has a similar configuration to the first support portion 110 so as to correspond to the first support portion 110.

The capacitor 100 according to the exemplary embodiment can be provided with a plurality of second support portions 120 for one first support portion 110, or may have a plurality of first support portions 110 for one second support portion 120. The number of the first support portion 110 and the second support portion 120 included in the capacitor 100 is appropriately selected in consideration of the configuration of the mounting board on which the capacitor 100 is to be mounted.

In the exemplary aspect, each of the plurality of second conductive columnar portions 122 has a nanosized outer diameter. Specifically, each of the plurality of second conductive columnar portions 122 is supported by the second support portion 120 and extends in one direction separating from the second support portion 120. Each of the plurality of second conductive columnar portions 122 can have a shape that each of the plurality of first conductive columnar portions 112 can have.

Each of the plurality of second conductive columnar portions 122 can be formed from a same material as each first conductive columnar portion 112. In the present embodiment, the plurality of second conductive columnar portions 122 are made of carbon nanotubes. In this way in the present embodiment, at least either the plurality of first conductive columnar portions 112 or the plurality of second conductive columnar portions 122 are made of carbon nanotubes. Specifically, both the plurality of first conductive columnar portions 112 and the plurality of second conductive columnar portions 122 are made of carbon nanotubes. In the present embodiment, each second conductive columnar portion 122 has substantially the same configuration as each of the plurality of first conductive columnar portions 112.

As shown in FIG. 1, each of the plurality of first conductive columnar portions 112 extends in one direction from the first support portion 110 toward the second support portion 120. Similarly, each of the plurality of second conductive columnar portions 122 extends in one direction (i.e., the same direction, but opposite from each other) from the second support portion 120 toward the first support portion 110. The tip 123 of each of the plurality of second conductive columnar portions 122 is located closer to the first support portion 110 than the tip 113 of each of the plurality of first conductive columnar portions 112. From the viewpoint of suppressing the decrease in volume capacity density, the position of the tip 113 of each first conductive columnar portion 112 becomes closer to the second support portion 120, and the position of the tip 123 of each second conductive columnar portion 122 becomes closer to the first support portion 110.

Figure 3:
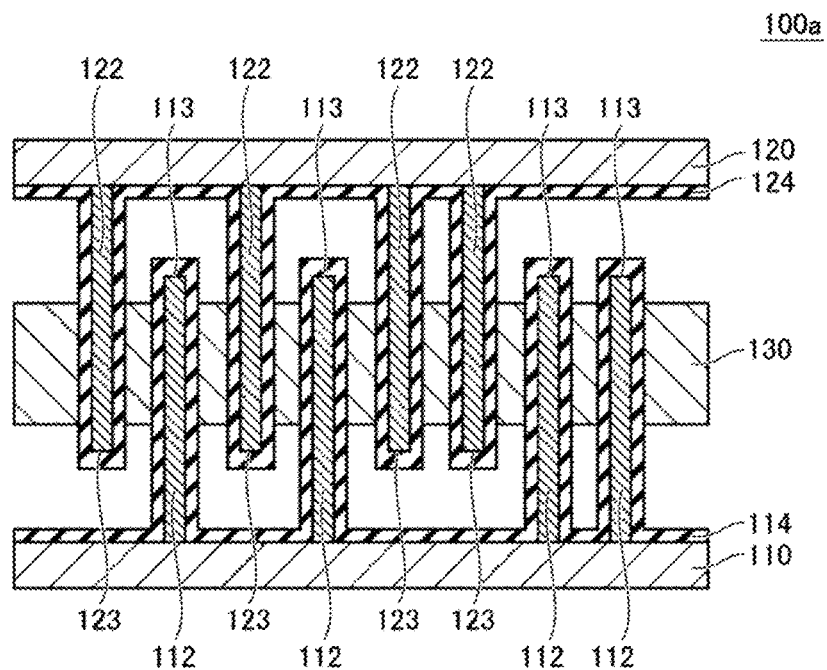
FIG. 3 is a sectional view showing a configuration of a capacitor according to a first modification of the first embodiment.

In the present embodiment, the plurality of first conductive columnar portions 112 and the plurality of second conductive columnar portions 122 can be alternately arranged on the virtual plane perpendicular to the one direction. As described above, in the present embodiment, the second conductive columnar portion 122 is the conductive columnar portion located closest to each of the plurality of first conductive columnar portions 112 on the virtual plane perpendicular to the one direction. However, it is noted that the relative positional relationship between the first conductive columnar portion 112 and the second conductive columnar portion 122 on the virtual plane is not particularly limited. FIG. 3 is a sectional view showing a configuration of a capacitor according to a first modification of the first exemplary embodiment. As shown in FIG. 3, in a capacitor 100a according to the first modification, at least one of the plurality of first conductive columnar portions 112 is located closer to another first conductive columnar portion 112 than the plurality of second conductive columnar portions 122 on the virtual plane. In addition, in the capacitor 100a according to the first modification, at least one of the plurality of second conductive columnar portions 122 is located closer to another second conductive columnar portion 122 than the plurality of the first conductive columnar portions 112 on the virtual plane.

As further shown in FIG. 1, in the capacitor 100 according to the first embodiment, each of the plurality of second conductive columnar portions 122 is coated with the second dielectric layer 124. Specifically, the whole of each of the plurality of second conductive columnar portions 122 is coated with the second dielectric layer 124 on the second support portion 120. In the present embodiment, the second dielectric layer 124 coating each of the plurality of second conductive columnar portions 122 is located in such a manner as to be continuous with each other on the second support portion 120.

It is also noted that the material of the second dielectric layer 124 is not particularly limited. In the present embodiment, the material of the second dielectric layer 124 may be a material that can form the first dielectric layer 114.

As shown in FIG. 1 and FIG. 2, the conductive portion 130 is provided or disposed above the first dielectric layer 114 and faces at least a part of each of the plurality of first conductive columnar portions 112 with the first dielectric layer 114 interposed therebetween. Similarly, the conductive portion 130 is provided on the second dielectric layer 124 and faces at least a part of each of the plurality of second conductive columnar portions 122 with the second dielectric layer 124 interposed therebetween. In the present embodiment, the first dielectric layer 114 is in contact with the second dielectric layer 124 with the conductive portion 130 interposed therebetween. A part of the first dielectric layer 114 may be in direct contact with a part of the second dielectric layer 124.

In the present embodiment, the conductive portion 130 on the first dielectric layer 114 and the conductive portion 130 on the second dielectric layer 124 are formed from an integral member. In the present embodiment, the conductive portion 130 is located between the tip 113 of each of the plurality of first conductive columnar portions 112 and the tip 123 of each of the plurality of second conductive columnar portions 122 in one direction from the first support portion 110 toward the second support portion 120.

Moreover, the material of the conductive portion 130 will be described in the description of a method for manufacturing the capacitor 100. Hereinafter, a method for manufacturing the capacitor 100 according to the first embodiment will be described.

Figure 4:
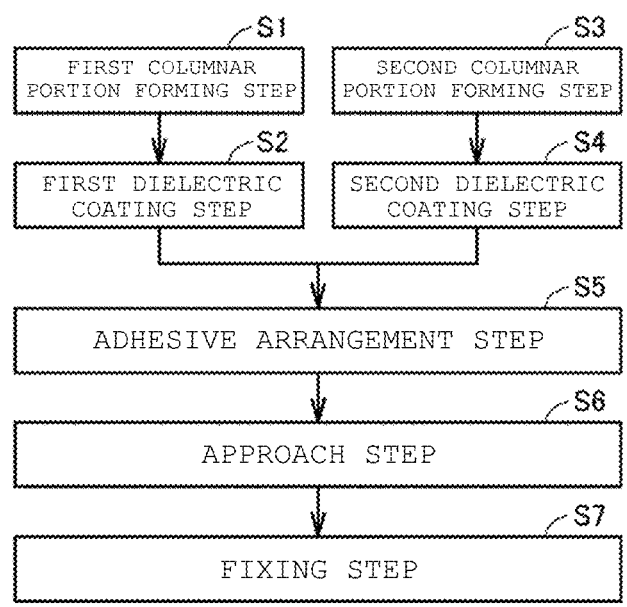
FIG. 4 is a flowchart showing a method for manufacturing a capacitor according to the first embodiment.

FIG. 4 is a flowchart showing a method for manufacturing the capacitor according to the first embodiment. As shown in FIG. 4, the method for manufacturing the capacitor 100 includes a first columnar portion forming step S1, a first dielectric coating step S2, a second columnar portion forming step S3, and a second dielectric coating step S4, an adhesive arrangement step S5, an approach step S6, and a fixing step S7.

Figure 5:
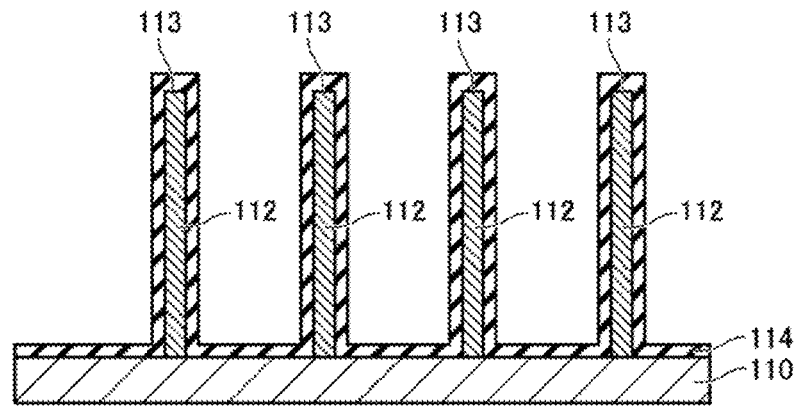
FIG. 5 is a view showing a state in which a plurality of first conductive columnar portions and a first dielectric layer are provided on a first support portion in the method for manufacturing a capacitor according to the first embodiment.

FIG. 5 is a view showing a state in which the plurality of first conductive columnar portions and the first dielectric layer are provided on the first support portion in the method for manufacturing a capacitor according to the first embodiment. As shown in FIG. 5, in the first columnar portion forming step S1, the first conductive columnar portion 112 is grown from the first support portion 110. In the present embodiment, carbon nanotubes, which are the first conductive columnar portions 112, are grown from catalyst particles arranged on the first support portion 110.

In an exemplary aspect, the catalyst particles are made of, for example, Fe, Ni or Co, or an alloy containing them when the first conductive columnar portion 112 is carbon nanotubes, and the catalyst particles are made of, for example, Pt, Au, or an alloy containing them when the first conductive columnar portion 112 contains ZnO. Examples of the method for arranging the catalyst particles include a combination of CVD method, sputtering or PVD (Physical Vapor Deposition) and lithography or etching. The positions of the catalyst particles are appropriately selected by patterning so that the first conductive columnar portion 112 and the second conductive columnar portion 122 are located apart from each other in the plane direction perpendicular to the one direction in the approach step S6 described later when viewed from one direction from the first support portion 110 toward the second support portion 120.

It is also noted that the method for growing the plurality of first conductive columnar portions 112 is not particularly limited. In the present embodiment, the plurality of first conductive columnar portions 112 can be grown by CVD method, plasma-enhanced CVD method, or the like. Examples of the gas used in CVD or plasma-enhanced CVD method include carbon monoxide, methane, ethylene, acetylene, or a mixture thereof with hydrogen or ammonia.

Each of the plurality of first conductive columnar portions 112 grows from the surface of the catalyst particles. Each of the plurality of first conductive columnar portions 112 grows such that the tip 113 separates from the first support portion 110. In the present embodiment, one first conductive columnar portion 112 grows from the plurality of catalyst particles in the above one set.

When each of the plurality of first conductive columnar portions 112 is grown by above-described CVD, plasma-enhanced CVD method, or the like, each of the plurality of first conductive columnar portions 112 can be grown to have a length and an outer diameter within a desired range by appropriately selecting temperature conditions, gas conditions, and the like. Note that the specific lengths of the plurality of first conductive columnar portions 112 are different from each other depending on the gas concentration, the gas flow rate, and the temperature variation on the surface of the first support portion 110.

Moreover, each of the plurality of first conductive columnar portions 112 can be, after being grown on a different substrate from the first support portion 110, transferred to the first support portion 110 in such a manner as to be inserted chemically or mechanically into the first support portion 110. In this case, the joint portion between the substrate and the first conductive columnar portion 112 becomes the tip 113 in the capacitor 100 according to the present embodiment. This process allows the tips 113 to be easily aligned in the plane direction substantially perpendicular to the above one direction.

The method for growing the plurality of first conductive columnar portions 112 on the substrate is the same as the method for growing the plurality of first conductive columnar portions 112 on the first support portion 110 described above. Examples of the material of the substrate include silicon oxide, silicon, gallium arsenide, aluminum, and SUS.

Each of the plurality of first conductive columnar portions 112 can be formed by thinly coating a columnar material with metal instead of forming by growing carbon nanotubes. Examples of specific methods of the coating include ALD (Atomic Layer Deposition) method, CVD (Chemical Vapor Deposition) method, MOCVD (Metalorganic Chemical Vapor Deposition) method, supercritical fluid deposition method, plating method, and a method of applying a conductive paste thereafter drying it.

As shown in FIG. 5, in the first dielectric coating step S2, coating with the first dielectric layer 114 is performed on the plurality of first conductive columnar portions 112 and on the face of the first support portion 110 where the plurality of first conductive columnar portions 112 are protruded. The coating method with the first dielectric layer 114 is not particularly limited, and examples thereof include plating method, ALD method, CVD method, MOCVD method, supercritical fluid deposition method, and sputtering. As shown in FIG. 4, the method for manufacturing the capacitor 100 according to the present embodiment includes the first dielectric coating step S2 before the adhesive arrangement step S5 and the approach step S6, which will be described later, but the first dielectric coating step S2 may be performed after the approach step S6.

As shown in FIGS. 1 and 4, in the second columnar portion forming step S3, the plurality of second conductive columnar portions 122 can be arranged on the second support portion 120 in the same method as in the method in which the first conductive columnar portion 112 can be arranged on the first support portion 110 in the first columnar portion forming step S1. In the second dielectric coating step S4, the second dielectric layer 124 can be arranged on the second support portion 120 and the second conductive columnar portion 122 in the same method as in the method in which the first dielectric layer 114 can be arranged on the first support portion 110 and the first conductive columnar portion 112 in the first dielectric coating step S2. As shown in FIG. 4, the method for manufacturing the capacitor 100 according to the present embodiment includes the second dielectric coating step S4 before the adhesive arrangement step S5 and the approach step S6, which will be described later, but the second dielectric coating step S4 may be performed after the approach step S6.

Figure 6:
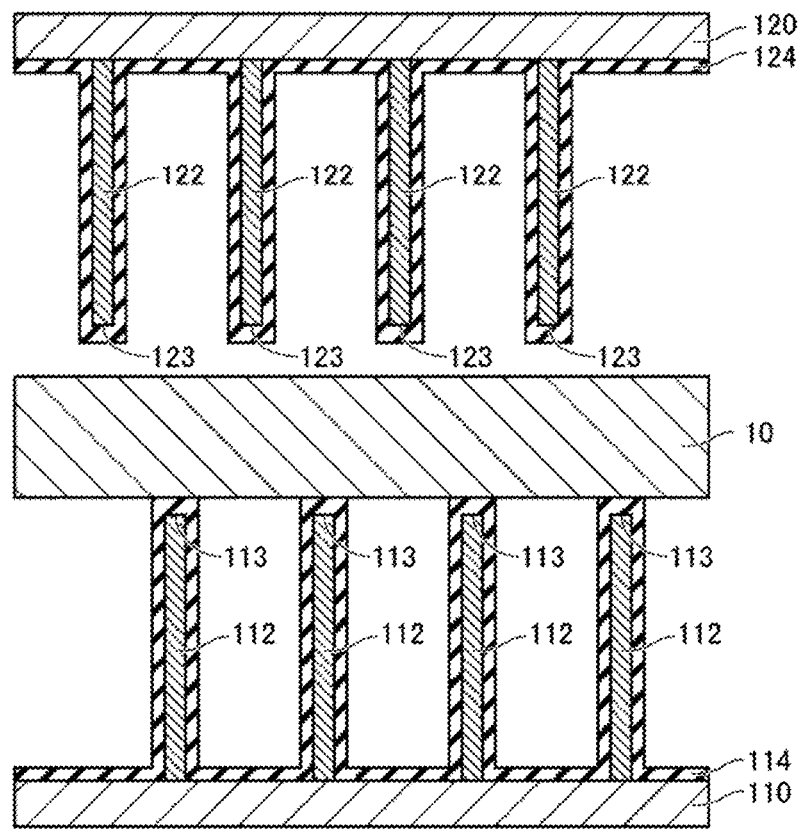
FIG. 6 is a view showing a state in which a sheet-shaped adhesive is arranged between the first support portion and a second support portion in the method for manufacturing a capacitor according to the first embodiment.

FIG. 6 is a view showing a state in which a sheet-shaped adhesive is arranged between the first support portion and the second support portion in the method for manufacturing a capacitor according to the first embodiment. As shown in FIGS. 4 and 6, in the adhesive arrangement step S5 of the present embodiment, a sheet-shaped adhesive 10 is arranged as an adhesive between the plurality of first conductive columnar portions 112 and the plurality of second conductive columnar portions 122 before the second support portion 120 is brought close to the first support portion 110. In the present embodiment, the sheet-shaped adhesive 10 is arranged on the first dielectric layer 114 provided on the tip 113 of each of the plurality of first conductive columnar portions 112.

As shown in FIG. 6, in the approach step S6, the second support portion 120 is brought close to the first support portion 110. Specifically, the plurality of first conductive columnar portions 112 and the plurality of second conductive columnar portions 122 are pressed against the sheet-shaped adhesive 10 with the first dielectric layer 114 and the second dielectric layer 124 interposed therebetween, respectively, and at the same time, the second support portion 120 is brought close to the first support portion 110. In the present embodiment, the plurality of first conductive columnar portions 112 coated with the first dielectric layer 114 and the plurality of second conductive columnar portions 122 coated with the second dielectric layer 124 penetrate the sheet-shaped adhesive 10. After the plurality of first conductive columnar portions 112 and the plurality of second conductive columnar portions 122 penetrate the sheet-shaped adhesive 10, the second support portion 120 is further brought close to the first support portion 110, whereby the tip 123 of each of the plurality of second conductive column portions 122 is arranged closer to the first support portion 110 than the tip 113 of each of the plurality of first conductive column portions 112.

In the approach step S6 of the present embodiment, the plurality of first conductive columnar portions 112 and the plurality of second conductive columnar portions 122 can be pressed against the sheet-shaped adhesive 10 while the sheet-shaped adhesive 10 is heated to reduce the viscosity.

In the fixing step S7, the plurality of first conductive columnar portions 112 and the plurality of second conductive columnar portions 122 are fixed to each other. In the present embodiment, the plurality of first conductive columnar portions 112 and the plurality of second conductive columnar portions 122 are fixed to each other by curing the adhesive. Specifically, the plurality of first conductive columnar portions 112 and the plurality of second conductive columnar portions 122 are fixed to each other with the cured adhesive and at least the first dielectric layer 114 and the second dielectric layer 124 interposed therebetween. When the sheet-shaped adhesive 10 is formed from a material whose viscosity is lowered by heating, the second support portion 120 is brought close to the first support portion 110 while the sheet-shaped adhesive 10 is heated, and then the sheet-shaped adhesive 10 may be cured by lowering the temperature of the sheet-shaped adhesive 10.

In this embodiment, the adhesive has conductivity. When the plurality of first conductive columnar portions 112 and the plurality of second conductive columnar portions 122 are fixed to each other, the cured adhesive becomes the conductive portion 130. In this manner, a part of each of the plurality of first conductive columnar portions 112 and a part of each of the plurality of second conductive columnar portions 122 are arranged in such a manner as to be embedded in the conductive portion 130, and therefore the adhesive, that is, the conductive portion 130, each of the plurality of first conductive columnar portions 112, and each of the plurality of second conductive columnar portions 122 are firmly adhered to each other by the anchor effect.

Therefore, in the present embodiment, the adhesive, that is, the conductive portion 130 is formed from a cured product of a paste-like conductive material containing a conductive polymer or a metal filler such as an Ag filler.

By the above steps, the capacitor 100 according to the first exemplary embodiment as shown in FIG. 1 can be manufactured.

Moreover, as described above, each of the plurality of first conductive columnar portions 112 is supported by the first support portion 110 and extends in one direction (e.g., a first direction) from the first support portion 110 toward the second support portion 120. Each of the plurality of second conductive columnar portions 122 is supported by the second support portion 120 and extends in one direction (e.g., a second direction opposite to the first direction) from the second support portion 120 toward the first support portion 110. The conductive portion 130 is provided on the first dielectric layer 114 and faces at least a part of each of the plurality of first conductive columnar portions 112 with the first dielectric layer 114 interposed therebetween. The conductive portion 130 is provided on the second dielectric layer 124 and faces at least a part of each of the plurality of second conductive columnar portions 122 with the second dielectric layer 124 interposed therebetween. As further shown, the tip 123 of each of the plurality of second conductive columnar portions 122 is located closer to the first support portion 110 than the tip 113 of each of the plurality of first conductive columnar portions 112.

This configuration improves the withstand voltage while suppressing the decrease in the volume capacity density in the capacitor 100 including the plurality of first conductive columnar portions 112 and the plurality of second conductive columnar portions 122 having nanosized outer diameters. Furthermore, the capacitor 100 having such a configuration can be efficiently and easily manufactured.

In the capacitor 100 according to the present embodiment, at least either the plurality of first conductive columnar portions 112 or the plurality of second conductive columnar portions 122 are made of carbon nanotubes. Because the conductive columnar portion made of carbon nanotubes has better mechanical properties than a conductive columnar portion made of metal of the same size, the reliability of the capacitor 100 can improve.

In the capacitor 100 according to the present embodiment, both the plurality of first conductive columnar portions 112 and the plurality of second conductive columnar portions 122 are made of carbon nanotubes. This configuration allows the mechanical properties of both the plurality of first conductive columnar portions 112 and the plurality of second conductive columnar portions 122 to be improved, and therefore the reliability of the capacitor 100 can further improve.

The method for manufacturing the capacitor 100 according to the first embodiment includes the approach step S6 for bringing the second support portion 120 closer to the first support portion 110 and the fixing step S7 for fixing the plurality of first conductive columnar portions 112 and the plurality of second conductive columnar portions 122 to each other. In the approach step S6, by bringing the second support portion 120 close to the first support portion 110, the tip of each of the plurality of second conductive columnar portions 122 is arranged closer to the first support portion 110 than the tip of each of the plurality of first conductive columnar portions 112. In the fixing step S7, the plurality of first conductive columnar portions 112 and the plurality of second conductive columnar portions 122 are fixed to each other with the adhesive and at least the first dielectric layer 114 and the second dielectric layer 124 interposed therebetween.

This process allows the capacitor 100, with improved withstand voltage while the decrease in the volume capacity density is suppressed, to be efficiently and easily manufactured.

In the method for manufacturing the capacitor 100 according to the present embodiment, the adhesive has conductivity. When the plurality of first conductive columnar portions 112 and the plurality of second conductive columnar portions 122 are fixed to each other, the cured adhesive becomes the conductive portion 130. This allows the counter electrode of each of the plurality of first conductive columnar portions 112 and the plurality of second conductive columnar portions 122 to be provided without separately coating each surface of the first dielectric layer 114 and the second dielectric layer 124 with the conductive portion 130.

The method for manufacturing the capacitor 100 according to the present embodiment further includes, before the second support portion 120 is brought close to the first support portion 110, the adhesive arrangement step S5 for arranging a sheet-shaped adhesive as an adhesive between the plurality of first conductive columnar portions 112 and the plurality of second conductive columnar portions 122. When the second support portion 120 is brought close to the first support portion 110, the second support portion 120 is brought close to the support portion 110 while the plurality of first conductive columnar portions 112 and the plurality of second conductive columnar portions 122 are pressed against the sheet-shaped adhesive.

This process allows the relative position of the member provided on the second support portion 120 side to be determined with respect to the member provided on the first support portion 110 side while providing the adhesive, and allows the capacitor 100 to be efficiently manufactured.

Embodiment 2

Hereinafter, a capacitor according to a second exemplary embodiment will be described. The capacitor according to this exemplary embodiment is different from the capacitor 100 according to the first embodiment in the relative position of the conductive portion with respect to the conductive columnar portion. The description of the same configuration as that of the capacitor 100 according to the first embodiment will not be repeated.

Figure 7:
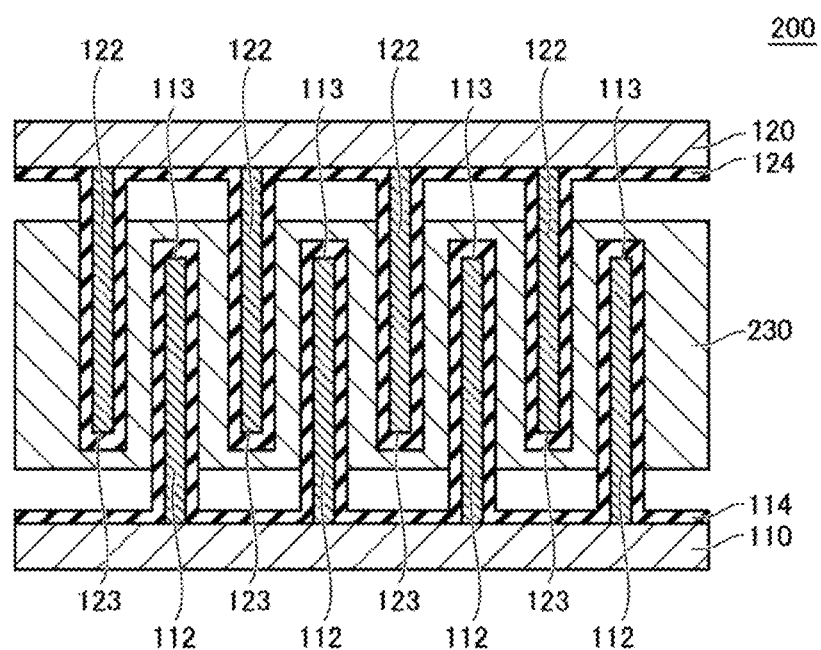
FIG. 7 is a sectional view showing a configuration of a capacitor according to a second exemplary embodiment.

FIG. 7 is a sectional view showing a configuration of a capacitor according to the second embodiment. As shown in FIG. 7, in a capacitor 200, a conductive portion 230 is located at least from the tip 113 of each of the plurality of first conductive columnar portions 112 to the tip 123 of each of the plurality of second conductive columnar portions 122 in one direction from the first support portion 110 toward the second support portion 120, on the first dielectric layer 114 and the second dielectric layer 124.

This configuration allows a facing area of each of the plurality of first conductive columnar portions 112 facing a corresponding one of the plurality of second conductive columnar portions 122 with the conductive portion 230 interposed therebetween to increase, and therefore, allows the capacitance of the capacitor 200 to increase. In addition, because the conductive portion 230 is arranged in the whole gap formed by the first conductive columnar portion 112 and the second conductive columnar portion 122 adjacent to each other in the plane direction perpendicular to the one direction, the sectional area of the conductive path inside the capacitor 200 can increase, and the parasitic resistance component in the capacitor 200 can decrease.

Further, in the capacitor according to the second embodiment, the conductive portion 230 faces the first conductive columnar portion 112 with the first dielectric layer 114 interposed therebetween on the tip 113 side of the plurality of first conductive columnar portions 112. In addition, the conductive portion 230 faces the second conductive columnar portion 122 with the second dielectric layer 124 interposed therebetween on the tip 123 side of the plurality of second conductive columnar portions 122. This configuration further increases the capacitance of the capacitor 200.

Next, a method for manufacturing the capacitor 200 according to the second embodiment will be described. The method for manufacturing the capacitor 200 is different from the method for manufacturing the capacitor 100 according to the first embodiment in the approach step S6.

In the approach step of the method for manufacturing the capacitor 200, when the second support portion 120 is brought close to the first support portion 110, the plurality of first conductive columnar portions 112 and the plurality of second conductive columnar portions 122 are pressed against the sheet-shaped adhesive 10 without penetrating it. As a result, the sheet-shaped adhesive 10 deforms along the shape of each of the plurality of first conductive columnar portions 112 and each of the plurality of second conductive columnar portions 122. Therefore, the cured adhesive, that is, the conductive portion 230 is arranged as described above with respect to the plurality of first conductive columnar portions 112 and the plurality of second conductive columnar portions 122.

In the method for manufacturing the capacitor 200 according to the second embodiment, the sheet-shaped adhesive 10 can be formed from a material that becomes gel-like or liquid by heating. This allows the cured adhesive, that is, the conductive portion 230 to be easily arranged as described above.

Embodiment 3

Hereinafter, a capacitor according to a third exemplary embodiment will be described. The capacitor according to this embodiment is different from the capacitor 100 according to the first embodiment mainly in the length of the conductive columnar portion. The description of the same configuration as that of the capacitor 100 according to the first embodiment will not be repeated.

Figure 8:
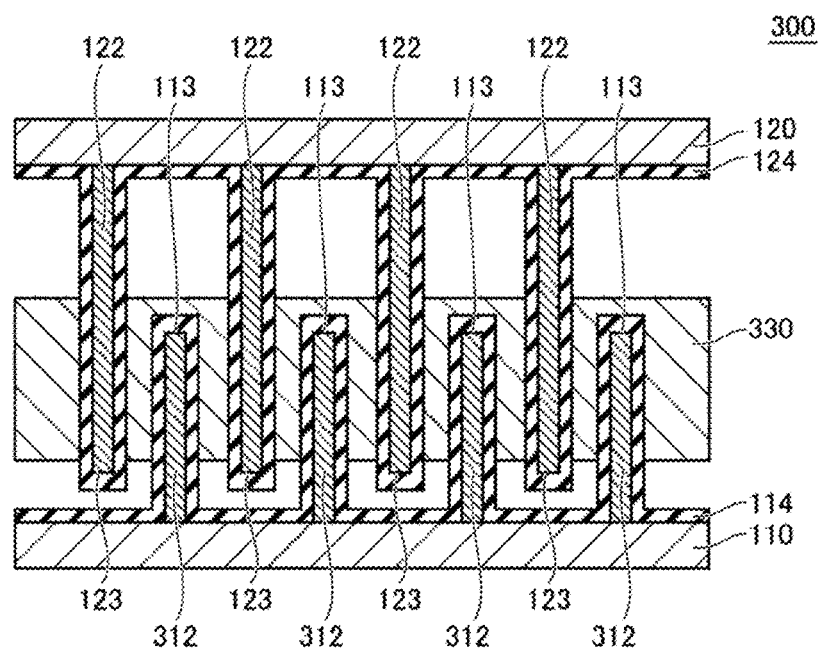
FIG. 8 is a sectional view showing a configuration of a capacitor according to a third exemplary embodiment.

FIG. 8 is a sectional view showing a configuration of the capacitor according to a third embodiment. As shown in FIG. 8, in a capacitor 300, a conductive portion 330 faces a plurality of first conductive columnar portions 312 with the first dielectric layer 114 interposed therebetween on the tip 113 side of the plurality of first conductive columnar portions 312. In addition, in the capacitor 300, the length dimension of each of the plurality of first conductive columnar portions 312 is larger than 0.6 times of the separation distance between the plurality of first support portions 110 and the plurality of second support portions 120. This configuration allows a decrease in the volume capacity density of the capacitor 300 to be suppressed.

Note that in this embodiment as well, the tip 123 of each of the plurality of second conductive columnar portions 122 is located closer to the first support portion 110 than the tip 113 of each of the plurality of first conductive columnar portions 312. This configuration allows the withstand voltage to be improved in the capacitor 300 while a decrease in the volume capacity density is suppressed, in the same way as in the capacitor 100 according to the first embodiment. Furthermore, the capacitor 300 having such a configuration can be manufactured efficiently and easily.

Embodiment 4

Hereinafter, a capacitor according to a fourth exemplary embodiment will be described. The capacitor according to the fourth embodiment is different from the capacitor 100 according to the first embodiment mainly in the length of the conductive columnar portion. The description of the same configuration as that of the capacitor 100 according to the first embodiment will not be repeated.

Figure 9:
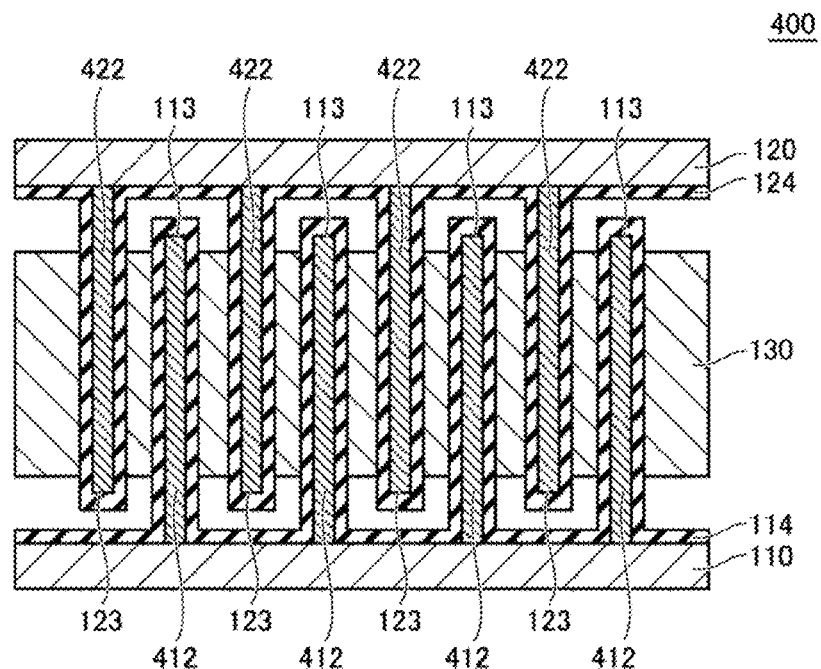
FIG. 9 is a sectional view showing a configuration of a capacitor according to a fourth exemplary embodiment.

FIG. 9 is a sectional view showing a configuration of the capacitor according to the fourth embodiment. As shown in FIG. 9, in a capacitor 400, the length dimension of each of a plurality of first conductive columnar portions 412 and each of a plurality of second conductive columnar portions 422 is larger than 0.9 times of the separation distance between the plurality of first support portion 110 and the second support portion 120. This configuration allows a decrease in the volume capacity density of the capacitor 400 to be suppressed.

In this embodiment as well, the tip 123 of each of the plurality of second conductive columnar portions 122 is located closer to the first support portion 110 than the tip 113 of each of the plurality of first conductive columnar portions 412. This configuration improves the withstand voltage in the capacitor 400 while a decrease in the volume capacity density is suppressed, in the same way as in the capacitor 100 as described above. Furthermore, the capacitor 400 having such a configuration can be manufactured efficiently and easily.

Embodiment 5

Hereinafter, a capacitor according to a fifth exemplary embodiment will be described. The capacitor according to the fifth embodiment is different from the capacitor 200 according to the second embodiment mainly in the position of the conductive portion. The description of the same configuration as that of the capacitor 200 will not be repeated.

Figure 10:
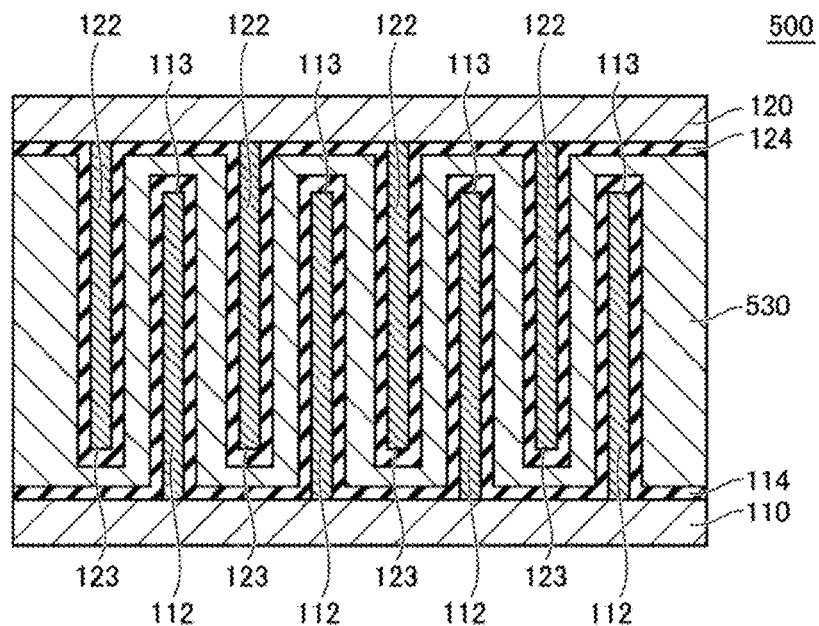
FIG. 10 is a sectional view showing a configuration of a capacitor according to a fifth exemplary embodiment.

FIG. 10 is a sectional view showing a configuration of the capacitor according to the fifth embodiment. As shown in FIG. 10, in a capacitor 500, a conductive portion 530 faces the whole of each of the plurality of first conductive columnar portions 112 with the first dielectric layer 114 interposed therebetween and faces the whole of each second conductive columnar portion 122 with the second dielectric layer 124 interposed therebetween. This configuration increases the facing area with the conductive portion 530 in each of the plurality of first conductive columnar portions 112 and the plurality of second conductive columnar portions 122, and therefore, allows the capacitance of the capacitor 500 to further increase.

Next, a method for manufacturing the capacitor 500 will be described. As the method for manufacturing the capacitor 500 according to the fifth embodiment, the same method as the method for manufacturing the capacitor 200 according to the second embodiment can be employed, but for the adhesive arrangement step S5, the approach step S6, and the fixing step S7, a different method can be employed.

A modified example of the method for manufacturing the capacitor 500 according to the fifth embodiment does not include the adhesive arrangement step S5. Instead of this adhesive arrangement step S5, the modified example of the method for manufacturing the capacitor 500, after the tip 123 of each of the plurality of second conductive columnar portions 122 is located closer to the first support portion 110 than the tip 113 of each of the plurality of first conductive columnar portions 112, a step of pouring a liquid or gel-like adhesive as an adhesive between the first support portion 110 and the second support portion 120.

This process allows the adhesive to be provided in the whole gap between the first dielectric layer 114 and the second dielectric layer 124, for example the gap between the tip 113 of the first conductive columnar portion 112 and the second support portion 120 or the gap between the tip 113 of the second conductive columnar portion 122 and the first support portion 110, in one direction from the first support portion 110 toward the second support portion 120. When this adhesive is cured to become the conductive portion 530, the facing area of the plurality of first conductive columnar portions 112 and the plurality of second conductive columnar portions 122 with the conductive portion 530 interposed therebetween can increase.

When the adhesive used in the modification example of the method for manufacturing the capacitor 500 becomes liquid or gel-like by heating, a preheated adhesive may be poured in the above-described pouring step, or the adhesive may be poured while heating.

In the modification example of the method for manufacturing the capacitor 500, because the adhesive is arranged by the above-described pouring step, it is not necessary to press the plurality of first conductive columnar portions 112 and the plurality of second conductive columnar portions 122 against the sheet-shaped adhesive 10 in the step of bringing the second support portion 120 close to the first support portion 110.

Embodiment 6

Hereinafter, a capacitor according to a sixth exemplary embodiment will be described. The capacitor according to the sixth embodiment is different from the capacitor 500 according to the fifth embodiment in the material forming at least some of the columnar portion. The description of the same configuration as that of the capacitor 500 will not be repeated.

Figure 11:
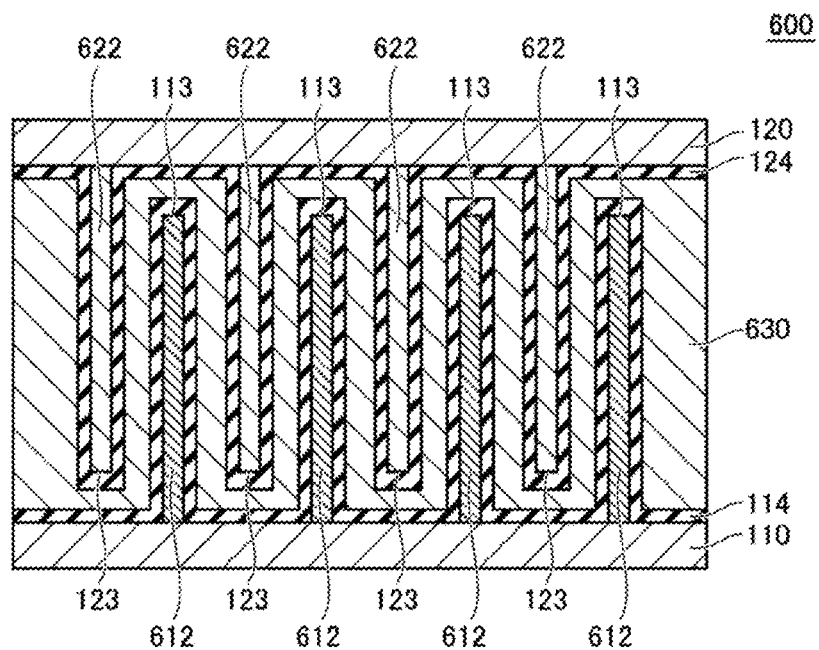
FIG. 11 is a sectional view showing a configuration of a capacitor according to a sixth exemplary embodiment.

FIG. 11 is a sectional view showing a configuration of the capacitor according to the sixth embodiment. As shown in FIG. 11, in a capacitor 600, either a plurality of first conductive columnar portions 612 or a plurality of second conductive columnar portions 622 are made of metal. This configuration improves the withstand voltage while a decrease in volume capacity density is suppressed when any one of the first conductive columnar portion 612 and the second conductive columnar portion 622 is a conductive columnar portion different from carbon nanotubes. In this embodiment, specifically, each of the plurality of second conductive columnar portions 622 is formed from a metal.

In the present embodiment, the plurality of second conductive columnar portions 622 formed from a metal are provided as follows. That is, in the same manner as in the method for manufacturing the capacitor 100 described above, a conductive portion 630 is stacked on the first dielectric layer 114 provided by the first columnar portion forming step S1 and the first dielectric coating step S2, by ALD method, MOCVD method, supercritical fluid deposition method, or the like. Then, a recess is formed in the stacked conductive portion 630 by chemical etching. The conductive portion 630 in which the recess is formed is further coated with the second dielectric layer 124 along the shape of the recess. Then, a second conductive columnar portion 622 is further provided on the second dielectric layer 124 formed on the recess. Finally, the second support portion 120 may be provided on the second dielectric layer 124 and the second conductive columnar portion 622.

Embodiment 7

Hereinafter, a capacitor according to a seventh exemplary embodiment will be described. The capacitor according to the seventh embodiment is different from the capacitor 100 according to the first embodiment mainly in that the conductive portion is divided into two parts. The description of the same configuration as that of the capacitor 100 will not be repeated.

Figure 12:
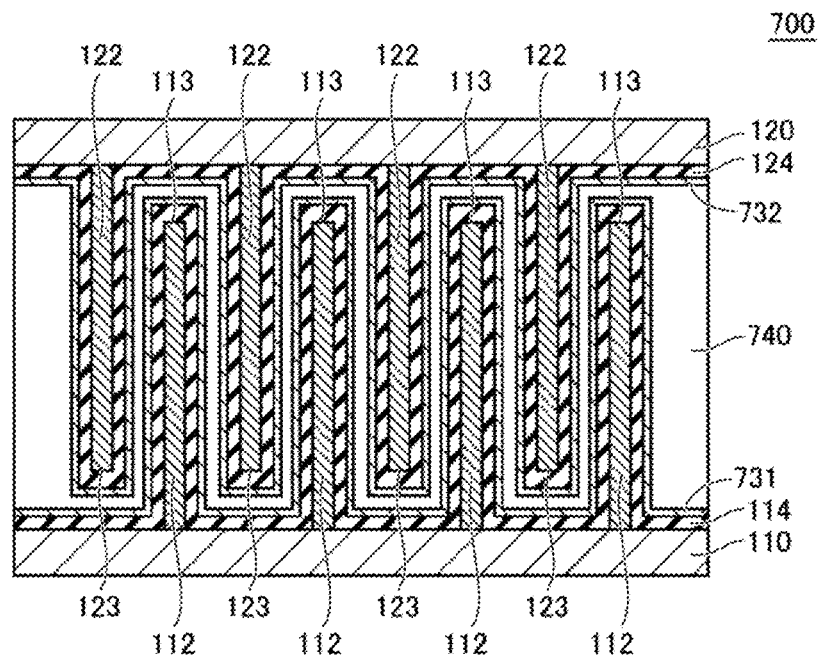
FIG. 12 is a sectional view showing a configuration of a capacitor according to a seventh exemplary embodiment.

FIG. 12 is a sectional view showing a configuration of the capacitor according to the seventh embodiment. As shown in FIG. 12, a capacitor 700 includes a first conductor layer 731 as a part of the conductive portion and a second conductor layer 732 as another part of the conductive portion. The first conductor layer 731 is formed over the whole first dielectric layer 114. The second conductor layer 732 is formed over the whole second dielectric layer 124.

The material of each of the first conductor layer 731 and the second conductor layer 732 is not particularly limited. Examples of the material of each of the first conductor layer 731 and the second conductor layer 732 include silver, gold, copper, platinum, aluminum, and alloys containing these.

The capacitor 700 according to the seventh embodiment further includes an intermediate fixing portion 740. The intermediate fixing portion 740 can be formed from a conductive material or an insulating material. When the intermediate fixing portion 740 is formed from a conductive material, the first conductor layer 731 and the second conductor layer 732 are electrically connected to each other, and therefore the capacitor 700 can have a configuration in which two capacitors are connected.

The specific position of the intermediate fixing portion 740 is not particularly limited as long as the fixing portion indirectly fixes each of the plurality of first conductive columnar portions 112 and the plurality of second conductive columnar portions 122 to each other. The intermediate fixing portion 740 may be located only between the tip 113 of the plurality of first conductive columnar portions 112 and the tip 123 of the plurality of second conductive columnar portions 122 in the above one direction or may be located in such a manner as to fill the gap between the first conductor layer 731 and the second conductor layer 732 between the first support portion 110 and the second support portion 120 in the above one direction.

It is noted that the method for forming the intermediate fixing portion 740 is not particularly limited, and the same method can be employed as the method for forming the conductive portion 130 of the capacitor 100 according to the first embodiment or the method for forming the conductive portion 530 of the capacitor 500 according to the fifth embodiment.

In the capacitor 700 according to the seventh exemplary embodiment as well, like in the capacitor 100 according to the first embodiment, the position of the tip 113 of each first conductive columnar portion 112 comes closer to the second support portion 120, and the tip 123 of each second conductive columnar portion 122 comes closer to the first support portion 110. However, it is noted that it is sufficient that the tip 123 of each of the plurality of second conductive columnar portions 122 is closer to the first support portion 110 than the tip 113 of each of the plurality of first columnar portions 112.

Figure 13:
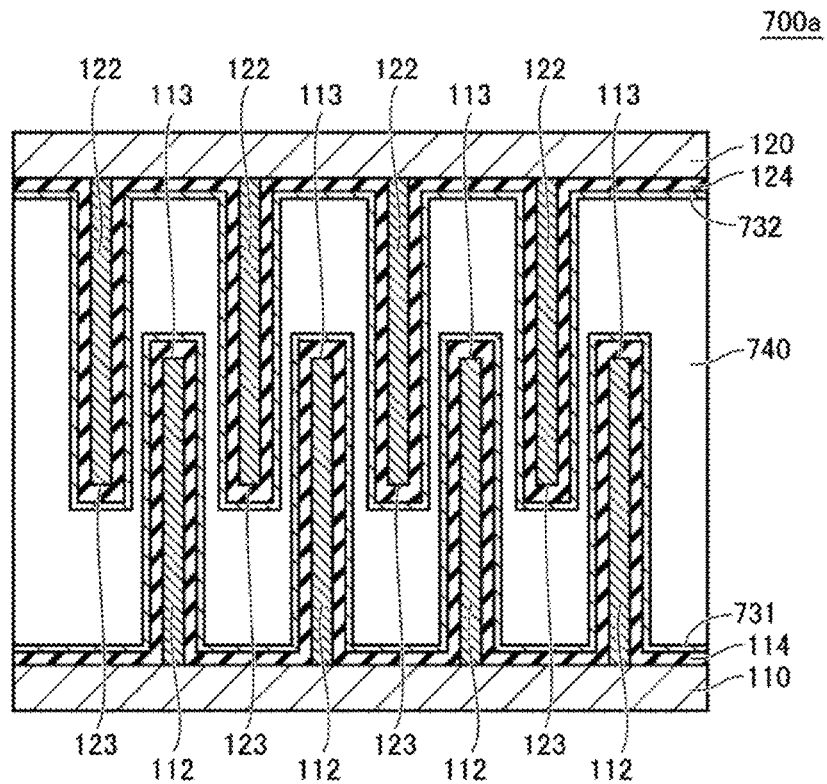
FIG. 13 is a sectional view showing a configuration of a capacitor according to a first modification of the seventh exemplary embodiment.

FIG. 13 is a sectional view showing a configuration of a capacitor according to a first modification of the seventh embodiment. As shown in FIG. 13, in a capacitor 700a according to the modification of the seventh embodiment, the separation distance between the tip 113 of each of the plurality of first conductive columnar portions 112 and the tip 123 of each of the plurality of second conductive columnar portions 122 is 0.6 times or less of the separation distance between the first support portion 110 and the second support portion 120 in one direction from the first support portion 110 toward the second support portion 120. However, because the tip 123 of each of the plurality of second conductive columnar portions 122 is located closer to the first support portion 110 than the tip 113 of each of the plurality of first conductive columnar portions 112, the withstand voltage is improved while a decrease in volume capacity density is suppressed.

A method for manufacturing the capacitor 700 according to the seventh embodiment further includes a step of stacking the first conductor layer 731 on the first dielectric layer 114 and a step of stacking the second conductor layer 732 on the second dielectric layer 124 before bringing the second support portion 120 close to the first support portion 110. The first conductor layer 731 and the second conductor layer 732 stacked in these stacking steps are highly adhesive at the interface with the first dielectric layer 114 and the second dielectric layer 124, respectively. Because of being highly adhesive, generation of bubbles is suppressed at these interfaces. On the other hand, in the capacitor 100 according to the first embodiment, when the conductive portion 130 made of an adhesive is adhered to the first dielectric layer 114 and the second dielectric layer 124, bubbles are generated at the adhesion interface. As described above, at the interface of the capacitor 700, because bubbles that affect the effective area of the counter electrode made of the first conductor layer 731 or the second conductor layer 732 are not generated, it is possible to further suppress a decrease in volume capacity density. In addition, the capacitor 700 having an improved withstand voltage while a decrease in volume capacity density is suppressed can be efficiently and easily manufactured by a manufacturing method different from that of the capacitor 100 according to first embodiment.

That is, in the present embodiment, each of the first conductor layer 731 and the second conductor layer 732 can be formed immediately after the first dielectric coating step S2 and the second dielectric coating step S4, respectively. The method of stacking the first conductor layer 731 and the second conductor layer 732 is not particularly limited. Each of the first conductor layer 731 and the second conductor layer 732 is formed by, for example, ALD method, CVD method, MOCVD method, supercritical fluid deposition method, sputtering method, or the like.

Embodiment 8

Hereinafter, a capacitor according to an eighth exemplary embodiment will be described. The capacitor according to the eighth embodiment is different from the capacitor 700 according to the seventh embodiment in that it further includes a fixing layer. The description of the same configuration as that of the capacitor 700 will not be repeated.

Figure 14:
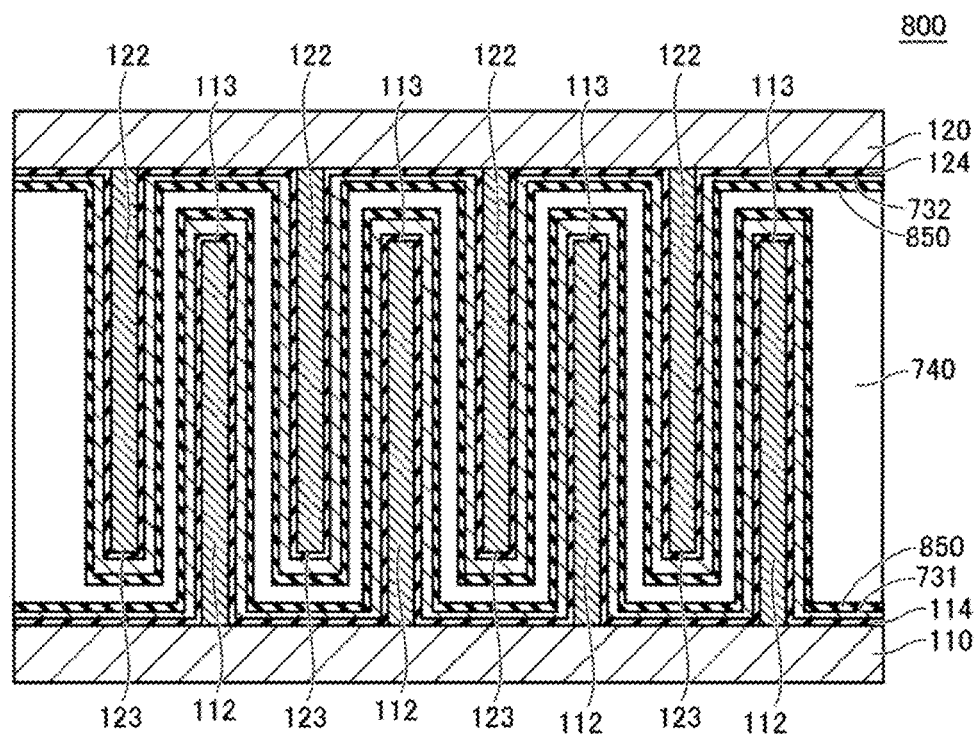
FIG. 14 is a sectional view showing a configuration of a capacitor according to an eighth exemplary embodiment.

FIG. 14 is a sectional view showing a configuration of the capacitor according to the eighth embodiment. As shown in FIG. 14, a capacitor 800 further includes a fixing layer 850. In the present embodiment, the fixing layer 850 is located between the first conductor layer 731 and the intermediate fixing portion 740. The fixing layer 850 is also located between the second conductor layer 732 and the intermediate fixing portion 740. Providing the fixing layer 850 prevents each of the plurality of first conductive columnar portions 112 and each of the plurality of second conductive columnar portions 122 from being deformed by their own weight or mechanical external force from the outside.

In this embodiment, the fixing layer 850 is formed from an insulating material. This configuration allows the capacitor 800 to include two independent capacitors while increasing the capacitance density per volume, when the intermediate fixing portion 740 is formed from an insulating material. The fixing layer 850 may be formed from a conductive material. When the intermediate fixing portion 740 is also formed from a conductive material, the mechanical strength of the capacitor 700 can improve and two capacitors can be connected in series.

Embodiment 9

Hereinafter, a capacitor according to a ninth exemplary embodiment will be described. The capacitor according to the ninth embodiment is different from the capacitor 100 according to the first embodiment mainly in the configuration of each columnar portion. The description of the same configuration as that of the capacitor 100 will not be repeated.

Figure 15:
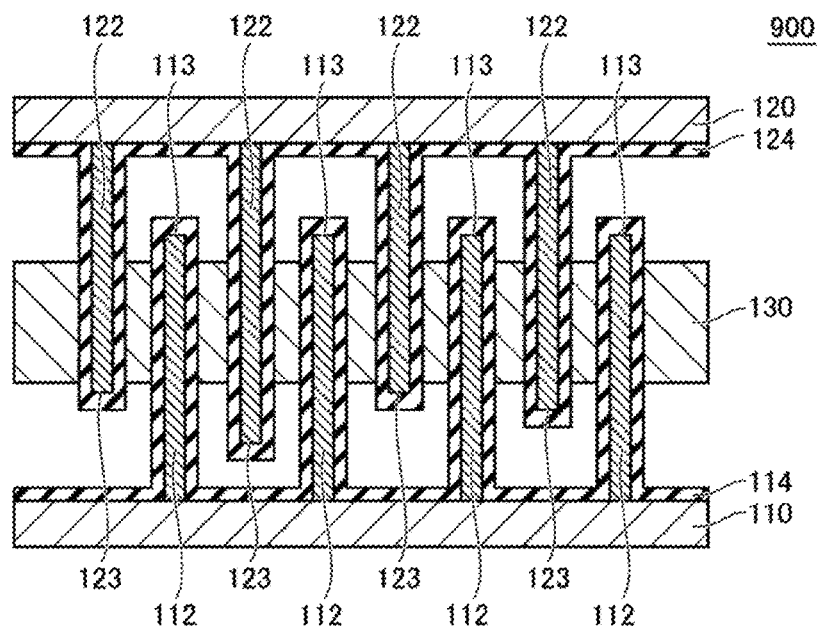
FIG. 15 is a sectional view showing a configuration of a capacitor according to a ninth exemplary embodiment.

FIG. 15 is a sectional view showing a configuration of the capacitor according to the ninth embodiment. As shown in FIG. 15, in a capacitor 900, the lengths of the plurality of second conductive columnar portions 122 are different from each other. In the capacitor 900, the tip 123 of each of the plurality of second conductive columnar portions 122 is located closer to the first support portion 110 than the tip 113 of each of the plurality of first conductive columnar portions 112. Therefore, in the capacitor 900, the withstand voltage is improved while a decrease in the volume capacity density is suppressed. Furthermore, the capacitor 900 having such a configuration can be manufactured efficiently and easily.

Embodiment 10

Hereinafter, a capacitor according to a tenth exemplary embodiment will be described. The capacitor according to the tenth embodiment is different from the capacitor 900 according to the ninth embodiment mainly in the configuration of each columnar portion. The description of the same configuration as that of the capacitor 900 will not be repeated.

Figure 16:
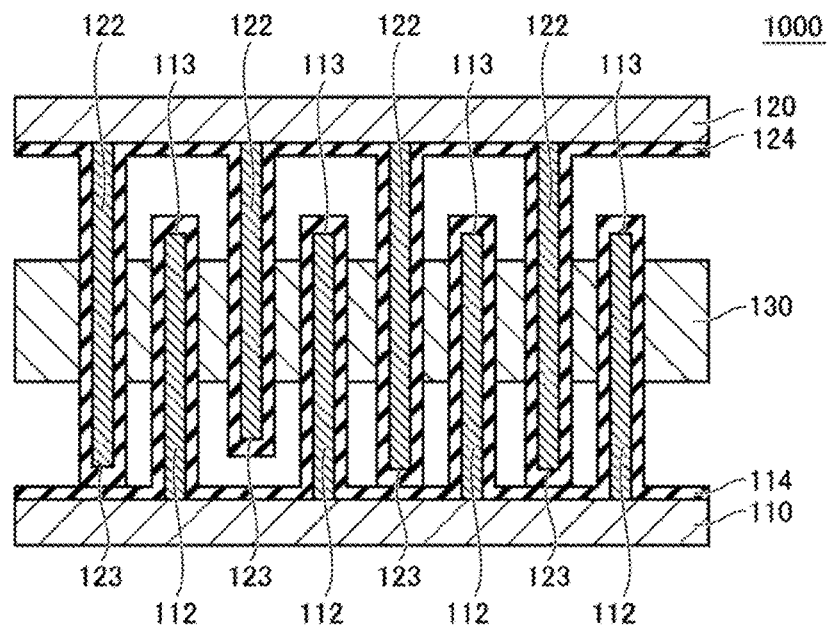
FIG. 16 is a sectional view showing a configuration of a capacitor according to a tenth exemplary embodiment.

FIG. 16 is a sectional view showing a configuration of the capacitor according to the tenth embodiment. As shown in FIG. 16, in a capacitor 1000, at least one of the plurality of second conductive columnar portions 122 is in contact with the first dielectric layer 114 at the tip 123 with the second dielectric layer 124 interposed therebetween. This configuration improves the mechanical strength of the capacitor 1000. At least one of the plurality of first conductive columnar portions 112 may be in contact with the second dielectric layer 124 at the tip 113 with the first dielectric layer 114 interposed therebetween.

Embodiment 11

Hereinafter, a capacitor according to an eleventh exemplary embodiment will be described. The capacitor according to the eleventh embodiment is different from the capacitor 1000 according to the tenth embodiment mainly in the configuration of each columnar portion. The description of the same configuration as that of the capacitor 1000 will not be repeated.

Figure 17:
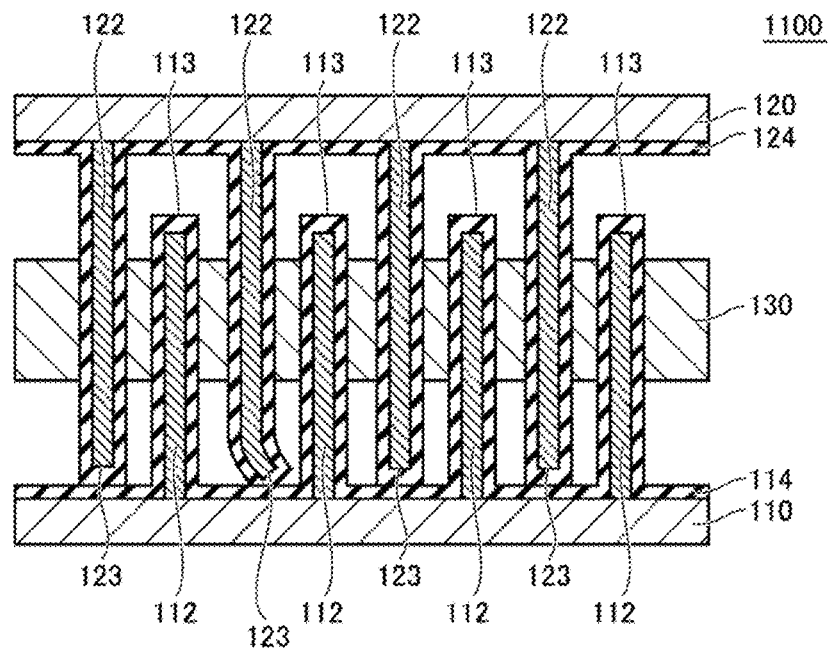
FIG. 17 is a sectional view showing a configuration of a capacitor according to an eleventh exemplary embodiment.

FIG. 17 is a sectional view showing a configuration of the capacitor according to the eleventh embodiment. As shown in FIG. 17, in a capacitor 1100, at least one of the plurality of second conductive columnar portions 122 is curved and in contact with the first dielectric layer 114 at the tip 123 with the second dielectric layer 124 interposed therebetween. This configuration improves the mechanical strength of the capacitor 1100 and improves the adhesive strength between the first conductive columnar portion 112 and the second conductive columnar portion 122 in one direction from the first support portion 110 toward the second support portion 120. At least one of the plurality of first conductive columnar portions 112 may be curved and in contact with the second dielectric layer 124 at the tip 113 with the first dielectric layer 114 interposed therebetween.

In general, it is noted that in the description of the above exemplary embodiments, the configurations that can be combined may be combined with each other.

DESCRIPTION OF REFERENCE SYMBOLS

10: Sheet-shaped adhesive
100, 100a, 200, 300, 400, 500, 600, 700, 700a, 800, 900, 1000, 1100: Capacitor
110: First support portion
112, 312, 412, 612: First conductive columnar portion
113, 123: Tip
114: First dielectric layer
120: Second support portion
122, 422, 622: Second conductive columnar portion
124: Second dielectric layer
130, 230, 330, 530, 630: Conductive portion
731: First conductor layer
732: Second conductor layer
740: Intermediate fixing portion
850: Fixing layer

The invention claimed is:

1. A capacitor comprising:
a first support portion;
a second support portion facing the first support portion with a distance therebetween;
a plurality of first conductive columnar portions supported by the first support portion and that extend along a first direction from the first support portion toward the second support portion, with each of the first conductive columnar portions having a nanosized outer diameter;
a first dielectric layer that coats each of the plurality of first conductive columnar portions;
a plurality of second conductive columnar portions supported by the second support portion and that extend along a second direction from the second support portion toward the first support portion, with each of the second conductive columnar portions having a nanosized outer diameter;
a second dielectric layer that coats each of the plurality of second conductive columnar portions; and
a conductive portion disposed on the first dielectric layer and facing at least a part of each of the plurality of first conductive columnar portions with the first dielectric layer interposed therebetween, and disposed on the second dielectric layer and facing at least a part of each of the plurality of second conductive columnar portions with the second dielectric layer interposed therebetween,
wherein a tip of each of the plurality of second conductive columnar portions is located closer to the first support portion than a tip of each of the plurality of first conductive columnar portions.

2. The capacitor according to claim 1, wherein the conductive portion is disposed between the tip of each of the plurality of first conductive columnar portions to the tip of each of the plurality of second conductive columnar portions.

3. The capacitor according to claim 2, wherein the respective tips of each of the plurality of first and second conductive columnar portions extend past respective sides of the conductive portion in a plan view thereof.

4. The capacitor according to claim 1, wherein at least one of the plurality of first conductive columnar portions and the plurality of second conductive columnar portions comprises a carbon nanotube.

5. The capacitor according to claim 4, wherein both the plurality of first conductive columnar portions and the plurality of second conductive columnar portions comprise carbon nanotube.

6. The capacitor according to claim 4, wherein any one of the plurality of first conductive columnar portions and the plurality of second conductive columnar portions comprises a metal material.

7. The capacitor according to claim 1, wherein
a whole of each of the plurality of first conductive columnar portions is coated with the first dielectric layer on the first support portion,
a whole of each of the plurality of second conductive columnar portions is coated with the second dielectric layer on the second support portion, and
the conductive portion faces the whole of each of the plurality of first conductive columnar portions with the first dielectric layer interposed therebetween and faces the whole of each of the plurality of second conductive columnar portions with the second dielectric layer interposed therebetween.

8. The capacitor according to claim 1, wherein the conductive portion extends in a lengthwise direction that is perpendicular to the first and second directions.

9. The capacitor according to claim 1, wherein each of the first and second support portions comprise a plate-like shape that faces each other.

10. The capacitor according to claim 1, wherein each of the respective tips of each of the plurality of first conductive columnar portions are aligned on a virtual plane perpendicular to the first and second directions.

11. The capacitor according to claim 1, wherein the nanosized outer diameter of each of the first and second conductive columnar portions is 0.1 nm or more and 1000 nm or less.

12. The capacitor according to claim 1, wherein the plurality of first conductive columnar portions and the plurality of second conductive columnar portions are alternately arranged on a virtual plane that is perpendicular to the first and second directions.

13. The capacitor according to claim 1, wherein the first dielectric layer is in contact with the second dielectric layer with the conductive portion interposed therebetween.

14. The capacitor according to claim 1, wherein the conductive portion is disposed at least from the tip of each of the plurality of first conductive columnar portions to the tip of each of the plurality of second conductive columnar portions.

15. The capacitor according to claim 1, wherein the conductive portion faces a whole of each of the plurality of first conductive columnar portions with the first dielectric layer interposed therebetween and faces a whole of each second conductive columnar portion with the second dielectric layer interposed therebetween.

16. A method for manufacturing a capacitor that includes:
a first support portion and a plurality of first conductive columnar portions extending from the first support portion and having a nanosized outer diameter,
a first dielectric layer coating each of the plurality of first conductive columnar portions,
a second support portion and a plurality of second conductive columnar portions extending from the second support portion and having a nanosized outer diameter, a second dielectric layer coating each of the plurality of second conductive columnar portions, and a conductive portion disposed on the first dielectric layer and facing at least a part of each of the plurality of first conductive columnar portions with the first dielectric layer interposed therebetween, and disposed on the second dielectric layer and facing at least a part of each of the plurality of second conductive columnar portions with the second dielectric layer interposed therebetween, the method comprising:

arranging a tip of each of the plurality of second conductive columnar portions closer to the first support portion than a tip of each of the plurality of first conductive columnar portions by bringing the second support portion towards the first support portion; and fixing the plurality of first conductive columnar portions to the plurality of second conductive columnar portions with an adhesive and at least the first dielectric layer and the second dielectric layer interposed therebetween.

17. The method for manufacturing a capacitor according to claim 16, wherein the adhesive has conductivity, and wherein the method further comprises curing the adhesive to form the conductive portion in fixing the plurality of first conductive columnar portions to the plurality of second conductive columnar portions.

18. The method for manufacturing a capacitor according to claim 16, further comprising:

stacking a first conductor layer on the first dielectric layer as a part of the conductive portion before bringing the second support portion towards the first support portion; and stacking a second conductor layer on the second dielectric layer as another part of the conductive portion before bringing the second support portion towards the first support portion.

19. The method for manufacturing a capacitor according to claim 16, further comprising:

arranging a sheet-shaped adhesive as the adhesive between the plurality of first conductive columnar portions and the plurality of second conductive columnar portions before bringing the second support portion towards the first support portion; and bringing the second support portion towards the first support portion while the plurality of first conductive columnar portions and the plurality of second conductive columnar portions are pressed against the sheet-shaped adhesive.

20. The method for manufacturing a capacitor according to claim 16, further comprising, after the tip of each of the plurality of second conductive columnar portions is located closer to the first support portion than the tip of each of the plurality of first conductive columnar portions, pouring a liquid or gel-like adhesive as the adhesive between the first support portion and the second support portion.

* * * * *